United States Patent
Chou et al.

(10) Patent No.: US 7,557,812 B2
(45) Date of Patent: *Jul. 7, 2009

(54) MULTILEVEL TEXTURE PROCESSING METHOD FOR MAPPING MULTIPLE IMAGES ONTO 3D MODELS

(75) Inventors: Hong-Long Chou, Hsinchu (TW); Chia-Chen Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/783,477

(22) Filed: Apr. 10, 2007

(65) Prior Publication Data

US 2007/0188511 A1    Aug. 16, 2007

Related U.S. Application Data

(63) Continuation of application No. 10/626,698, filed on Jul. 25, 2003, now Pat. No. 7,265,761.

(30) Foreign Application Priority Data

May 16, 2003    (TW)  ............................... 92113358 A

(51) Int. Cl.
*G09G 5/00* (2006.01)
(52) U.S. Cl. .................... 345/586; 345/420; 345/427; 345/582; 345/589; 345/629
(58) Field of Classification Search .................. 345/586
See application file for complete search history.

(56) References Cited

U.S. PATENT DOCUMENTS

| | | | |
|---|---|---|---|
| 5,561,746 A | 10/1996 | Murata et al. | |
| 6,057,850 A | 5/2000 | Kichury | |
| 6,249,616 B1 | 6/2001 | Hashimoto | |
| 6,281,904 B1 | 8/2001 | Reinhardt et al. | |
| 6,349,153 B1 | 2/2002 | Teo | |
| 6,385,349 B1 | 5/2002 | Teo | |
| 6,469,710 B1 | 10/2002 | Shum et al. | |
| 6,493,095 B1 | 12/2002 | Song et al. | |
| 6,977,660 B2 | 12/2005 | Fujiwara et al. | |
| 7,265,761 B2 * | 9/2007 | Chou et al. | ................. 345/586 |
| 2003/0091226 A1 | 5/2003 | Cahill et al. | |
| 2004/0125106 A1 | 7/2004 | Chen | |

OTHER PUBLICATIONS

Weinhaus, F. and Devarajan, V., "Texture Mapping 3D Models of Real-World Scenes", ACM Computing Surveys, vol. 29, No. 4, Dec. 1997, pp. 325-365.

(Continued)

*Primary Examiner*—Antonio A Caschera
(74) *Attorney, Agent, or Firm*—Rabin & Berdo, P.C.

(57) ABSTRACT

A multilevel texture mapping process for a 3D model that maps different perspective images onto a 3D model is developed. The textures mapped to the 3D model are processed from image level to texture level, then to pixel level to ease the edge appearance problem at the boundary where neighboring images are stitched together caused by different lighting and viewing parameters. The result shows that the smooth transition between neighboring textures provides better visual quality than just blending the boundary where neighboring images are stitched.

8 Claims, 4 Drawing Sheets

OTHER PUBLICATIONS

Debevec, P., "Rendering Synthetic Objects into Real Scenes: Bridging Traditional and Image-based Graphics with Global Illumination and High Dynamic Range Photopraphy", Proc. of 25th Annual Conf. on Comp. Graphics & Interactive Techniques, 1998, pp. 1-10.

Debevec, P., Taylor, C., and Malik, J., "Modeling and Rendering Architecture from Photographs: A hybrid geometry- and image-based approach", Proceedings of 23rd Annual Conf. on Computer Graphics and Interactive Techniques, 1996, pp. 11-20.

* cited by examiner

MULTILEVEL TEXTURE PROCESSING METHOD FOR MAPPING MULTIPLE IMAGES ONTO 3D MODELS

This is a Continuation of U.S. application Ser. No.: 10/626, 698, filed on Jul. 25, 2005.

BACKGROUND OF THE INVENTION

1. Field of Invention

The invention relates to a texture mapping process for 3D models for mapping images onto a 3D model. In particular, the invention is a multilevel texture processing method that processes images at the image level, the texture level, and then the pixel level and adjusts image pixel intensity on the texture.

2. Related Art

The texture mapping technology is used to increase the reality of computer generated images (CGIs) in the field of computer graphics. Through realistic images, the texture mapping technique provides better image rendering effects with fewer polygons of the 3D models. With the advance in integrated circuit (IC) designs, the operating functions and texture memory required for texture mapping have been incorporated into most of the graphic acceleration chips. Therefore, one can find many examples that use texture mapping to generate photo-realistic images in different kinds of applications, such as games, animations, and 3D websites.

Generally speaking, to obtain a textured 3D model, one has to construct a complete and accurate digital 3D model of the object manually or by 3D scanning. The next step is to take 2D images of the object and to establish projection relations between the 3D model and the 2D images. After obtaining the 3D model of the object and the projection relation between it and some perspective image, we can project the digital 3D model onto a 2D image through the projection relation. In this manner, the image areas covered by the polygons in the 3D model are set to be the textures corresponding to the polygons. This completes the settings of the texture mapping.

When mapping textures from an image onto a 3D model, we can use the above-mentioned procedure to obtain a textured model rapidly. However, an image is not sufficient to cover the textures of the whole surface of the object. In this case, the rendering of the model has a crack or a shading problem. Consequently, one needs images from different perspectives to completely determine the texture for each polygon of the 3D model. When taking images of an object from different viewing perspectives, there may be different shading for the same point on the object surface due to the facts that pictures are taken at different time, different light sources, and under different camera setting conditions (zooming, focus, camera position). Such differences will result in variations in the texture of a digital 3D model, and show visual defects in the image rendering.

To eliminate this problem of texture inconsistency, we can generate a global map from a textured 3D model through projections, such as projecting textures of the 3D model onto a cylindrical or spherical surface. The pixel color variations in each area are then adjusted manually using existing image processing software such as PhotoImpact© and PhotoShop©. However, manually adjusting the intensity of each pixel on the global map requires a lot of time for a person familiar with image processing tools. In U.S. Pat. No. 6,057,850, a method has been proposed using a calibrated lighting system that can be controlled and positioned to take images of an object with different lighting conditions. The images are stitched together by performing different levels of intelligent pixel-wise blending according to the lighting condition and the camera position. In this manner, shades due to different lighting conditions are eliminated by averaging according to their weights, providing an image with less dependence on the light sources. Afterwards, textures are extracted from the image and mapped onto the 3D model. This method allows one to rebuild a new image using different lighting conditions and camera positions. Nevertheless, it requires a special lighting system with the positioning function to obtain a better effect.

On the other hand, the U.S. Pat. No. 6,281,904 divides the 3D model into several different planar areas. Firstly, the user manually selects a corresponding projection region in an image for each region on the 3D model. The projection regions for the same region on the 3D model on different images are mixed together using various methods. This method is concerned with how to modify the texture resolution and intensity of the same region from different images but it does not smooth the differences among different regions. Also, occlusion occurs for the common region in different images is not dealt with. To improve the situation, the U.S. Pat. No. 6,469,710 proposes the concept of alpha blending. The contribution of each pixel in the projection regions of different images for the same 3D model surface region to the final texture is determined. If there are images of other objects in the projection region, the contribution of this pixel is set to be zero, eliminating effects of erroneous pixels. However, the texture processing operation is applied to the projection of the same 3D model surface region individually. The texture variation among regions will still have different visual transition effects.

SUMMARY OF THE INVENTION

In view of the foregoing, the invention provides a multilevel texture processing method for mapping multiple images onto 3D models. Using this method, the textures of neighboring polygons do not have discontinuous variations in the pixel intensity due to different lighting conditions and camera parameter settings. This preserves the photo-realistic quality of the computer-generated image (CGI).

The disclosed method mainly divides the image pixel intensity mapping process into three levels: the image level, the texture level, and the pixel level. The pixel intensity in each level is adjusted at different strengths. At the image level, the pixel intensities of overlapped polygons are used to compute the weighted mean of intensity, and then the whole image is adjusted accordingly. The adjustments at the texture level use predetermined conditions to take one of the textures in the overlapped polygons and apply a normalization operation to compute the required texture. It then further blurs the textures with its neighboring polygons so that it becomes smoother. Finally, the pixel-level step processes the colors of pixels inside the polygons to obtain a smooth transition textured 3D model. At the same time, the invention can perform accumulated processes on input image data, so that no new calculations are needed when new images are entered. This can save much time in processing.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
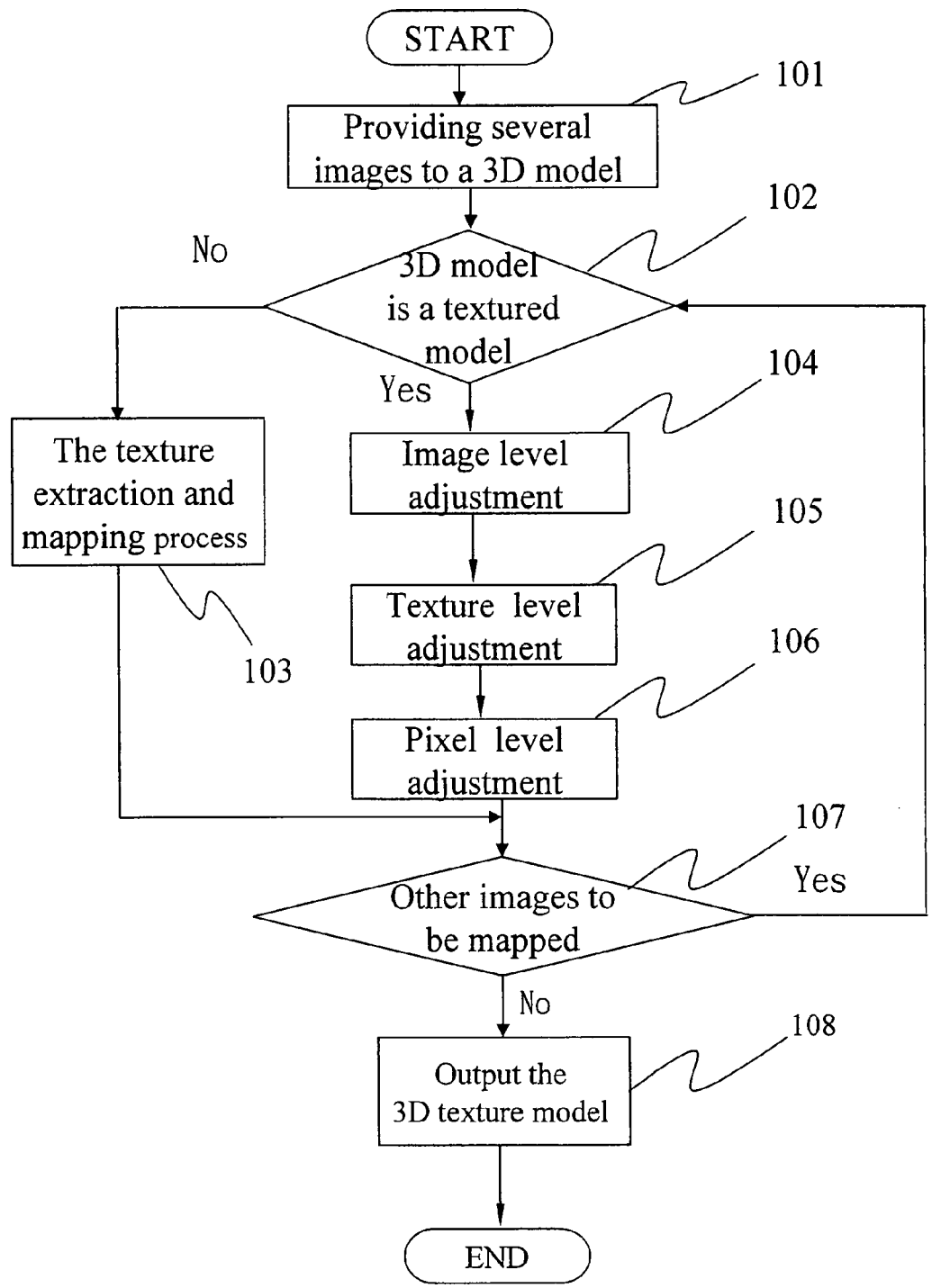
FIG. 1 is a schematic flowchart of the invention.

With reference to FIG. 1, the disclosed multilevel texture processing method for mapping multiple images onto a 3D model starts by providing several images to a 3D model (step 101). The sources of the images can be obtained by taking pictures of an object from different perspectives. It does not need any special lighting system as in the prior art. Then the method determines whether the 3D model is a textured model (step 102). If the input image is the first image to be extracted and pasted on the 3D model, then the answer is obviously "no," and the texture extraction and mapping start (step 103). If the input image is not the first image, then the answer is "yes," and the image is adjusted in order at the image level (step 104), the texture level (step 105), and the pixel level (step 106). Afterwards, the method determines whether there are any other images not processed yet (step 107). After all images are processed, the method outputs the textured 3D model (step 108). An advantage of this method is that no new calculation has to be made and accumulated calculations can be done at any time a new image is added.

As said before, the texture extraction and mapping start when the input image is the first one to be mapped onto the 3D model (step 103). After an image and a 3D model are loaded into memory, the projection matrix of the image is first determined manually or from an automatic camera calibration procedure. Afterwards, the polygons of the digital 3D model are projected onto the real images using the projection matrix. If a polygon projected on the image is visible, then the region covered by the polygon is set to be its texture; otherwise, it is skipped and the procedure continues to the next polygon. The procedure is executed iteratively until all the polygons are processed. At this moment, since there is only a single image, there may be many blank polygons without textures attached on the 3D model.

Figure 2:
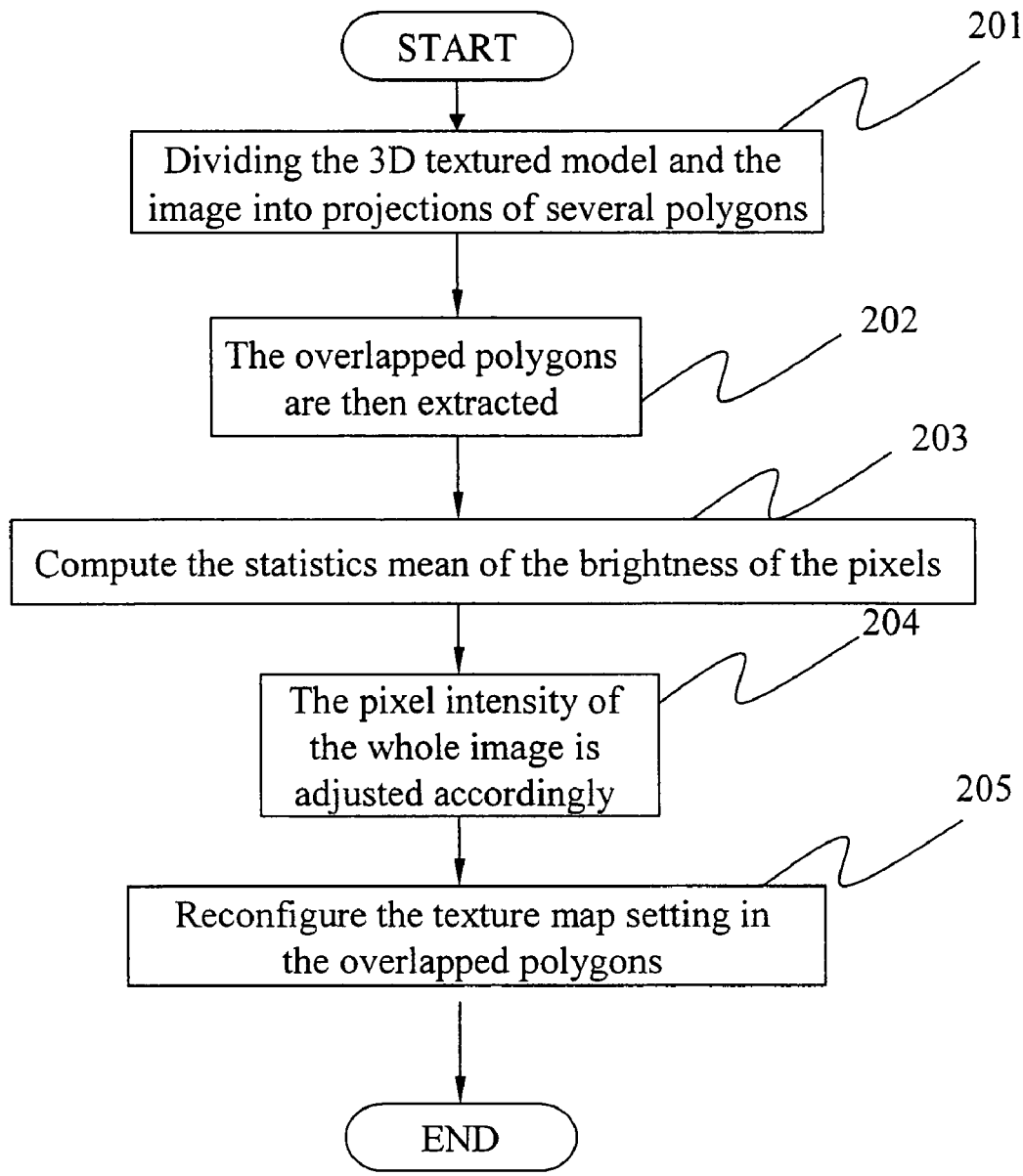
FIG. 2 is a flowchart for processing at the image level.

After the 3D model is textured with the image, if there are other images to be extracted and mapped onto the model, they are processed with the following three-level procedure, the image-level adjustments (step 104), the texture-level adjustments (step 105), and the pixel-level adjustments (step 106). Please refer to FIG. 2. Before two images are combined, the method first divides the 3D textured model and the image into projections of several polygons (step 201). The method converts the image and the texture mapping to a common spatial coordinate system. Of course, the same spatial coordinates have to be used during the division transformation. The overlapped polygons are then extracted (step 202). These overlapped polygons are used to compute the statistics of the brightness of the pixels (step 203). Then, the pixel intensity of the whole image is adjusted according to (step 204). The formula for this adjustment is as follows:

$$I'_s(x_i, y_i) = I_s(x_i, y_i) - \mu_s + \mu_b,$$

where $\mu_s$ is the averaged pixel intensity of the overlapped polygons on the 3D model; $\mu_b$ is the averaged pixel intensity of the overlapped polygon of the input image; $I_s(x_i, y_i)$ is the pixel intensity of each point on the 3D model; and $I'_s(x_i, y_i)$ is the adjusted pixel intensity of each point on the 3D model.

In other words, the method uses the statistics distribution of pixel intensity of the overlapped polygons to adjust the pixel intensity of the whole image. Therefore, the pixel intensity receives a preliminary adjustment immediately after the image is entered.

After the pixel intensity of the image is adjusted, the method continues to reconfigure the texture map settings in the overlapped polygons (step 205). The adjustment is made according to the resolution, polygon orientation, viewing perspective, and so on. For example, if one uses the resolution as the determination criterion, then the polygon texture with a larger resolution can be directly used as the final polygon texture. The other conditions can be similarly applied.

Figure 3:
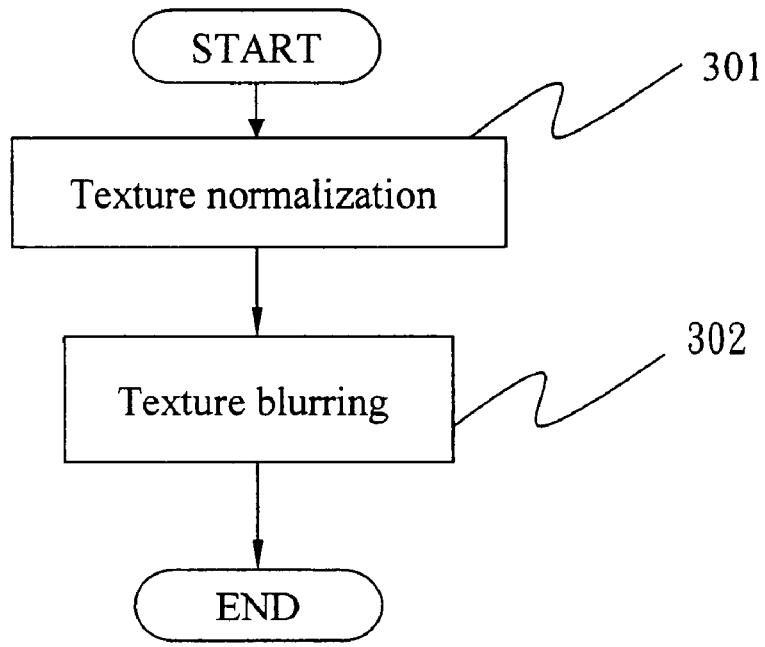
FIG. 3 is a flowchart for processing at the texture level.

After the image-level adjustments (step 104) and texture map reconfiguration (step 205), the method performs the texture-level adjustments to smooth the texture of the polygons. As shown in FIG. 3, the smoothing can be achieved using texture normalization (step 301) and texture blurring (step 302). The texture normalization (step 301) mainly takes the averaged pixel intensity of the texture in the overlapped polygon and feeds into the following formula:

$$T'_s(x_i, y_i) = T_s(x_i, y_i) - \mu_s + \mu_b,$$

where $\mu_s$ is the averaged pixel intensity of the overlapped polygon on the 3D model; $\mu_b$ is the averaged pixel intensity of the overlapped polygon on the input image; $T_s(x_i, y_i)$ is the texture pixel intensity at each point in the polygon; and $T'_s(x_i, y_i)$ is the adjusted texture pixel intensity at each point in the polygon.

Figure 4:
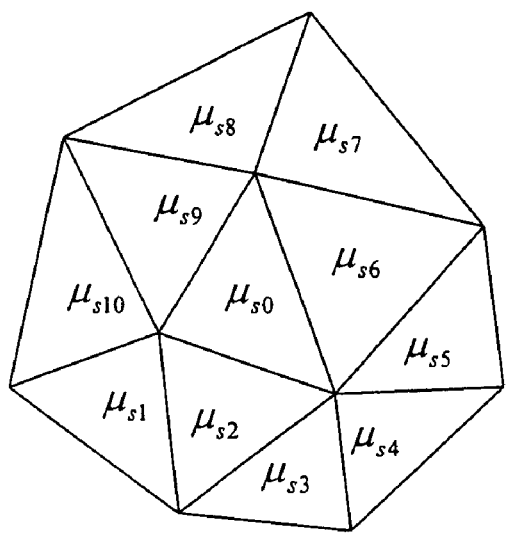
FIG. 4 is a schematic view of the neighboring polygons.

The method then performs texture blurring (step 302). The averaged intensity $\mu_{s0}$ of the texture corresponding to each polygon is first computed (FIG. 4). The averaged intensities $\mu_{s0} \sim \mu_{s10}$ of the surrounding polygon textures are also computed. The formula $$\mu'_{s0} = \sum_i w_i \mu_{si}$$

is then used to compute the destination intensity. The weight is determined using different conditions (such as distance and brightness). This makes the texture of each polygon match with its surrounding ones. The boundaries of neighboring polygons are thus blurred and smoothed. Of course, the polygons shown in the drawing are triangular. However, any geometrical shape can be used.

Figure 5:
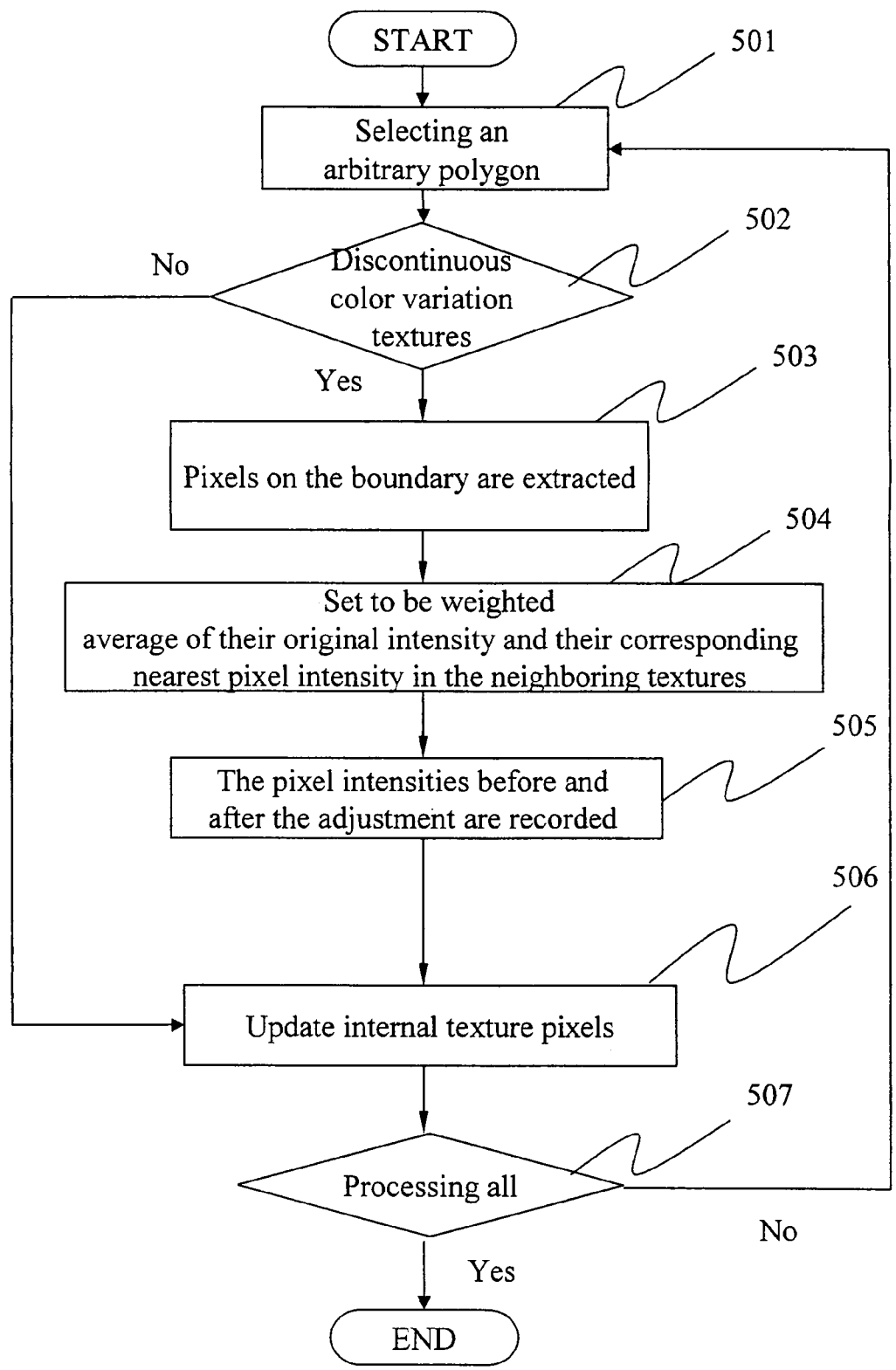
FIG. 5 is a flowchart for processing at the pixel level.

Finally, step 106 performs the pixel-level adjustments. With reference to FIG. 5, an arbitrary polygon is selected (step 501). The method determines whether it has a discontinuous color variation from the neighboring polygon textures (step 502). If there is a discontinuous color change between the textures, then pixel intensity modification process is invoked. Otherwise, the method updates internal texture pixels (step 506) and ensures all the other polygons if there are any not processed yet (step 507). The pixel intensity modification process consists of threes steps: Firstly, a pixel, p, is extracted from the boundary (step 503). The method searches another image point in neighboring polygon textures that is closest to the boundary pixel p. The pixel intensity of the boundary image point is set to be a weighted average of the two (step 504). The pixel intensities before and after the adjustment are recorded so that the difference can be used to adjust the intensities of other pixels inside the polygon (step 505). The pixel intensity adjustment inside the polygon is done using the following formula:

$$T'_s(x, y) = T_s(x, y) + \sum_{i=1}^{N} w_i \cdot Id_i$$

where $w_i$ is a relevant weight; $Id_i$ is the adjusted difference; N is the number of total adjustments; $T_s(x_i,y_i)$ is the pixel intensity of each point on the 3D model; and $T_{s'(xi,y_i)}$ is the adjusted pixel intensity of each point on the 3D model.

In the above formula, we may use the pixel intensity difference of a single (N=1) nearest boundary pixel or pixels on different boundaries (N=the number of sides in a polyhedron). This helps achieving smooth visual effects. The color and brightness variations between two regions can be eliminated.

Certain variations would be apparent to those skilled in the art, which variations are considered within the spirit and scope of the claimed invention.

What is claimed is:

1. A multilevel texture processing method performed in a computer graphics system for mapping an image onto a 3D model with a texture mapping, the method comprising the steps of:
   providing the image to the 3D model in the computer graphics system;
   converting the image and the texture mapping to a same spatial coordinate system and dividing them into a plurality of polygons;
   comparing the image with the texture mapping within the spatial coordinate system to extract overlapped polygons;
   using the pixel intensity of the overlapped polygons to compute a statistics mean for adjusting the pixel intensity of the image accordingly;
   using a prescribed condition to select the texture of one of the image and the texture mapping as the texture of a polygon of the overlapped polygons;
   smoothing the texture of the polygon;
   making the pixels inside the polygon continuous; and
   outputting the 3D model.

2. The method of claim 1, wherein the prescribed condition is selected from the group consisting of resolution, polygon orientation, and camera viewing perspective.

3. The method of claim 1, wherein the step of smoothing the texture of the polygon includes texture normalization and texture blurring.

4. The method of claim 3, wherein the texture normalization uses the pixel intensities of the polygons in both the image and the texture mapping to compute a weighted average for adjustment.

5. The method of claim 3, wherein the texture blurring uses the textures of the polygon and its neighboring polygons to compute a weighted average for adjustment.

6. The method of claim 1, wherein the step of making the pixels inside the polygon continuous is achieved by mixing colors with the neighboring polygons.

7. The method of claim 6, wherein the step of mixing colors with the neighboring polygons includes the steps of:
   extracting a pixel on the border of the polygon with discontinuous colors; and
   computing a weighted average of the intensities of the pixel and its nearest neighboring pixels as a new intensity of the pixel.

8. The method of claim 7, wherein the step of computing a weighted average of the intensities of the pixel and its nearest neighboring pixels as a new intensity of the pixel is followed by the steps of:
   computing the difference between the weighted average intensity and the original pixel intensity; and
   using the pixel intensity difference to adjust the intensities of the rest of the pixels inside the polygonal texture.

* * * * *